(12) United States Patent
Spruce (10) Patent No.: US 10,400,749 B2
(45) Date of Patent: Sep. 3, 2019

(54) WIND TURBINE

(75) Inventor: Chris Spruce, Leatherhead (GB)

(73) Assignee: Vestas Wind Systems A/S, Aarhus N. (DK)

( * ) Notice: Subject to any disclaimer, the term of this patent is extended or adjusted under 35 U.S.C. 154(b) by 977 days.

(21) Appl. No.: 13/640,008

(22) PCT Filed: Apr. 8, 2011

(86) PCT No.: PCT/DK2011/050118
§ 371 (c)(1),
(2), (4) Date: Feb. 8, 2013

(87) PCT Pub. No.: WO2011/124230
PCT Pub. Date: Oct. 13, 2011

(65) Prior Publication Data
US 2013/0129508 A1    May 23, 2013

Related U.S. Application Data

(60) Provisional application No. 61/322,545, filed on Apr. 9, 2010.

(30) Foreign Application Priority Data

Apr. 9, 2010    (GB) .................................. 1005985.5

(51) Int. Cl.
| F03D 7/00 | (2006.01) |
| F03D 7/02 | (2006.01) |
| F03D 7/04 | (2006.01) |

(52) U.S. Cl.
CPC .............. *F03D 7/00* (2013.01); *F03D 7/024* (2013.01); *F03D 7/0224* (2013.01);
(Continued)

(58) Field of Classification Search
CPC .......... F03D 7/024; F03D 7/00; F03D 7/0224; F03D 7/0232; F03D 7/0292; F03D 7/042;
(Continued)

(56) References Cited

U.S. PATENT DOCUMENTS

| 6,441,507 B1 | 8/2002 | Deering et al. |
| 6,619,918 B1 * | 9/2003 | Rebsdorf .............. F03D 7/0224 416/1 |

(Continued)

FOREIGN PATENT DOCUMENTS

| DE | 102005034899 A1 | 2/2007 |
| EP | 1630415 A2 | 3/2006 |

(Continued)

OTHER PUBLICATIONS

International Searching Authority, Search Report and Written Opinion in corresponding International Application No. PCT/DK2011/050118 dated Nov. 25, 2011, 10 pages.

(Continued)

*Primary Examiner* — Richard A Edgar
(74) *Attorney, Agent, or Firm* — Wood Herron & Evans LLP (57) ABSTRACT

A wind turbine comprising: a rotor having a plurality of blades; and a controller. The controller is arranged to independently control each of the plurality of blades and/or one or more components of each blade in order to increase a driving moment of each blade independently of other of the blades when speed of wind acting on the wind turbine is below rated. The controller is also additionally or alternatively arranged to independently control each of the plurality of blades and/or one or more components of each blade independently of other of the blades when wind force acting on the blades is above cut-out in order to reduce a mechanical load experienced by at least a part of the wind turbine.

36 Claims, 7 Drawing Sheets

(52) U.S. Cl.
CPC ......... *F03D 7/0232* (2013.01); *F03D 7/0292* (2013.01); *F03D 7/042* (2013.01); *F05B 2270/3201* (2013.01); *F05B 2270/321* (2013.01); *Y02B 10/30* (2013.01); *Y02E 10/723* (2013.01)

(58) Field of Classification Search
CPC .... F03D 7/0256; F03D 7/0264; F03D 7/0268; F03D 7/0272; F03D 7/0276; F03D 7/028; F03D 7/0288
See application file for complete search history.

(56) References Cited

U.S. PATENT DOCUMENTS

| | | | |
|---|---|---|---|
| 6,809,431 B1* | 10/2004 | Schippmann | F03D 7/0224 290/44 |
| 7,118,339 B2* | 10/2006 | Moroz | F03D 1/008 415/4.3 |
| 7,281,891 B2* | 10/2007 | Smith | F03D 7/0224 290/55 |
| 7,522,976 B2* | 4/2009 | Stommel | F03D 7/0224 290/44 |
| 7,573,149 B2* | 8/2009 | Kammer | F03D 7/0224 290/44 |
| 7,950,901 B2* | 5/2011 | Barbu | F03D 7/0224 415/1 |
| 2002/0004725 A1 | 1/2002 | Martin et al. | |
| 2006/0145483 A1 | 7/2006 | Larsen et al. | |
| 2007/0036653 A1* | 2/2007 | Bak | F03D 1/0641 416/98 |
| 2007/0212209 A1 | 9/2007 | Borgen | |
| 2007/0286728 A1 | 12/2007 | Hotto | |
| 2008/0206055 A1 | 8/2008 | Godsk et al. | |
| 2009/0047116 A1 | 2/2009 | Barbu et al. | |
| 2010/0014969 A1* | 1/2010 | Wilson | F03D 7/0224 416/1 |
| 2010/0289266 A1* | 11/2010 | Wortmann | F03D 7/0224 290/44 |

FOREIGN PATENT DOCUMENTS

| | | | |
|---|---|---|---|
| EP | 1666723 A1 | 6/2006 | |
| EP | 1890034 A1 | 2/2008 | |
| EP | 1978246 A1 | 10/2008 | |
| JP | 2004011543 A | 1/2004 | |
| WO | WO 2006090215 A1 * | 8/2006 | ........... F03D 1/0641 |

OTHER PUBLICATIONS

Intellectual Property Office, Search and Examination Report issued in corresponding GB Application No. 1005985.5 dated Aug. 2, 2010, 6 pages.

Nora Lindner; International Preliminary Report on Patentability issued in International Patent Application No. PCT/DK2011/050118; dated Oct. 9, 2012; 6 pages; European Patent Office.

European Patent Office, Official Action issued in Application No. 11716470.7 dated Dec. 4, 2015.

European Patent Office, Examination Report in EP Application No. 11716470.7, dated Oct. 18, 2016.

E.A. Bossanyi, Individual Blade Pitch Control for Load Reduction, Wind Energy, vol. 6, pp. 119-128.

* cited by examiner

WIND TURBINE

BACKGROUND OF THE INVENTION

The invention relates to a wind turbine, a wind turbine controller, and a method of controlling a wind turbine. It relates in particular to a wind turbine suitable for use in large scale electricity generation on a wind farm, for example.

Figure 1:
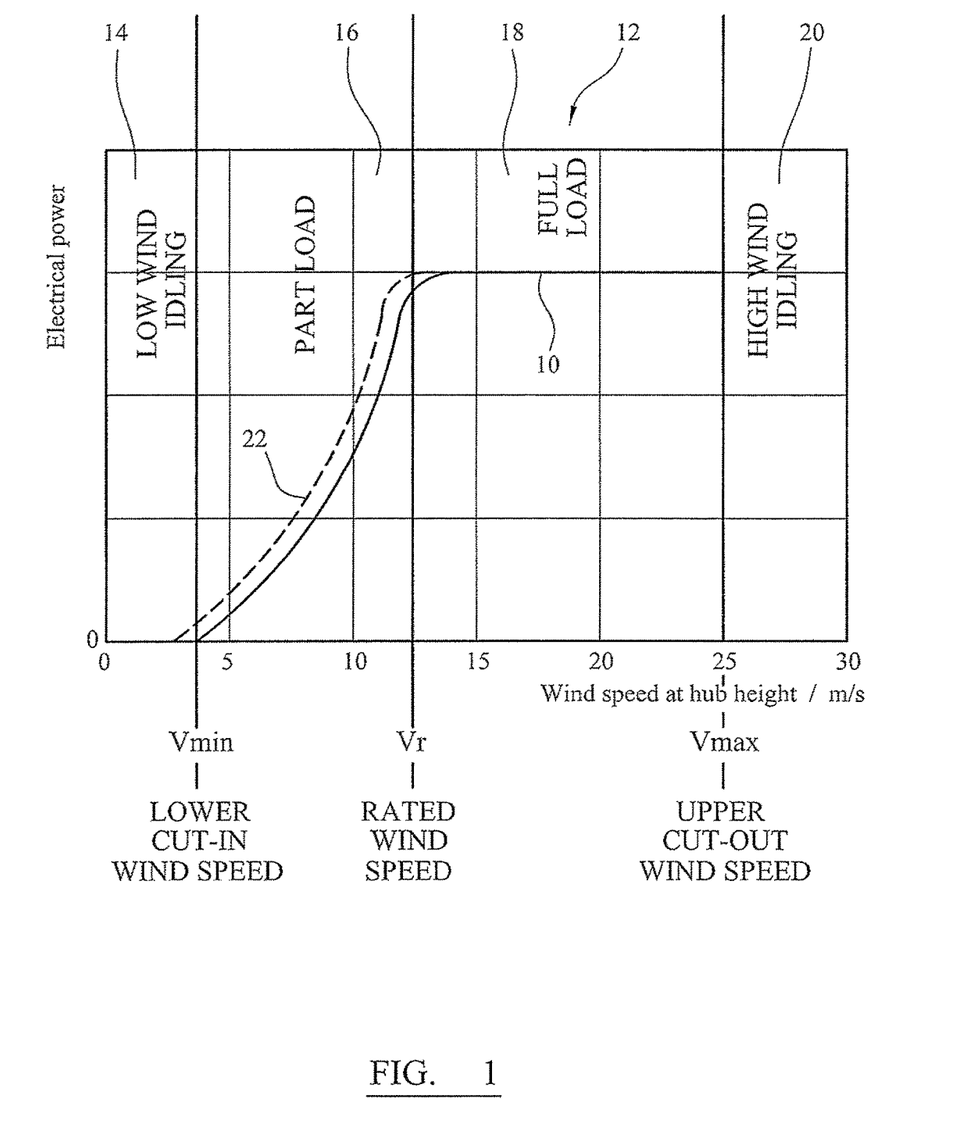
FIG. 1 is a graph showing power output against wind speed for a known wind turbine and a wind turbine embodying an aspect of the invention.

In FIG. 1, the solid line 10 of the graph 12 illustrates the variation of power output with wind speed (measured at the height of the hub) for a typical wind turbine used for large scale electricity generation. As is well known in the art, for a wind turbine with a doubly fed induction generator (DFIG), at very low wind speeds, typically between 0 and 3 or 4 m/s, the wind turbine idles. That is to say, the blades of the wind turbine do not rotate such that the wind turbine generates electrical power. This is because there is not considered to be enough energy available from the wind to generate power from the wind turbine. This is the low wind idling region 14. At a lower cut-in wind speed Vmin, typically between 3 or 4 m/s, the blades of the wind turbine start to rotate to generate power at part or partial (electrical) load. This is called the part load region 16. The part load region is typically between wind speeds of 3 or 4 m/s and 12 or 13 m/s. For a wind turbine with a full converter, there may not be an idling region where the blades rotate but no electrical power is generated from the wind turbine. In a typical wind turbine having a full converter, as soon as the force of the wind overcomes the frictional forces in the drive train and the rotor blades start rotating, the wind turbine will start generating electrical power. Thus, in the present invention, the lower cut-in wind speed Vmin on a wind turbine having a full converter may be defined as the wind speed at which the blades start to rotate and electrical power is generated.

As the wind speed increases, the wind turbine enters the full load region 18, at and above the rated wind speed Vr, where the blades of the wind turbine rotate to produce substantially the same power at any wind speed in this region. That is to say, in the full load region, the wind turbine generates the maximum permissible power output of the generator and the power output is substantially independent of the wind speed. The power output is regulated to be substantially constant. The full load region is typically between wind speeds of 12 or 13 m/s and 25 m/s. Finally, at high wind speeds at or above Vmax, the upper cut-out wind speed, the wind turbine idles (the blades of the wind turbine do not rotate to generate electrical power; and the generator of the wind turbine is disconnected from the electricity distribution network or grid) and this is called the high wind idling region 20. The upper cut-out wind speed, Vmax, is typically 20 m/s or 25 m/s. At these high wind speeds, the wind turbine is shut down for safety reasons, in particular to reduce the loads acting on the wind turbine, which can damage it.

Wind turbines usually have mechanisms for changing the aerodynamic effect of the wind acting on their blades. These mechanisms include blade pitching (where each blade of a wind turbine is rotated about its longitudinal axis) or providing moveable flaps as part of the wind turbine blade. These mechanisms are used in particular ways at particular wind speeds.

Commonly, blade pitching is used to compensate for variations in wind speed over the height of the wind turbine caused by so-called wind shear. Typically, to compensate for this, wind turbine arrangements include blades that pitch in a cyclical fashion as the blades rotate at rated wind speeds, such as in US patent application No. US 2008/0206055. This variation in wind speed over the height of the wind turbine also results in loads acting on wind turbine blades varying across the blades and blade pitching is known to reduce the resultant asymmetric loading across a wind turbine in these circumstances such as described in European patent application No. EP 1978246, US patent application No. US 2007/0286728, US patent application No. US 2007/0212209, US patent application No. US 2006/0145483, US patent application No. US2002/004725, and Bossanyi, E. A. "Individual Blade Pitch Control for Load Reduction"; Wind Energy, Volume 6, pages 119-128.

In other arrangements the same pitch angle is applied to all of the blades, such as described in European patent application No. EP 1666723. In this system, a common pitch-angle is applied to all of the blades with the aim of reducing stresses on the blades at low or full loads.

Blade pitching is also used to reduce forces in wind turbine blades at high winds such as in European patent application No. EP 1890034 in which there is interdependence between the pitch angles of the blades under these wind conditions; and in German patent application No. DE 102005034899 where the blades of a wind turbine are all pitched together to shutdown the wind turbine. The wind turbine described in European patent application No. EP 1630415 includes another mechanism for reducing forces during severe wind conditions, such as a heavy storm or hurricane. The wind turbine in this document has outboard blade sections which are folded in to reduce the lift forces under these extreme circumstances.

One arrangement describing the use of flaps in wind turbine blades to alter the aerodynamic properties of the blade is described in US patent application No. 2007/0003403. The aim of the described arrangement is to allow the turbine to operate at wind speeds above the upper cut-out wind speed at which the turbine would have otherwise been stopped to prevent excessive load being applied to the wind turbine. The flaps of particular blades in a particular rotational position are adjusted so that they adopt the position of the flaps of other blades when they were in the same rotational position. In other words, there is interdependence between the flap positions.

It would be advantageous if a wind turbine had reduced mechanical loads at high wind speeds above the upper cut-out wind speed. This would help to prevent damage to the wind turbine. Furthermore, the wind turbine could be built to resist lower extreme loads and the cost to build the wind turbine would be reduced.

The inventor of the system described herein is the first to appreciate that blades of a wind turbine may be independently controlled of the other blades (such as by pitching the blades) and/or by independently controlling one or more components of each blade (such as by moving flaps or tabs of each blade) in order to reduce mechanical loads of one or more components of the wind turbine (such as the blades or tower) when wind speed acting on the blades is above cut-out.

SUMMARY OF THE INVENTION

The invention in its various aspects is defined in the independent claims below. Advantageous features are defined in the dependent claims below.

A preferred embodiment of the invention is described in more detail below and takes the form of a wind turbine comprising: a rotor having a plurality of blades; and a controller. The controller is arranged to independently control each of the plurality of blades and/or one or more components of the blades when the speed of wind acting on the blades is above a cut-out wind speed in order to reduce a mechanical load experienced by at least part of the wind turbine.

The decrease in mechanical loads at high wind speeds above upper cut-out wind speed, helps prevent damage to the wind turbine; it leads to a reduction in extreme loads and in some arrangements fatigue loads. Thus, the blades and other components of the wind turbine can be built to resist a lower extreme load and the cost to build the wind turbine is reduced.

The present invention may be applied to wind turbines having a DFIG or a full converter.

For the purposes of the present invention, the term "cut-in wind speed" or "lower cut-in wind speed" means the wind speed at which the wind turbine starts to generate electrical power. For a DFIG, this will typically be the wind speed at which the turbine connects to the electrical grid. For a wind turbine with a full span converter, this is typically when the rotor blades start to rotate.

BRIEF DESCRIPTION OF THE DRAWINGS

Preferred embodiments of the invention will now be described, by way of example, and with reference to the drawings in which.

DETAILED DESCRIPTION OF PREFERRED EMBODIMENTS

Figure 2:
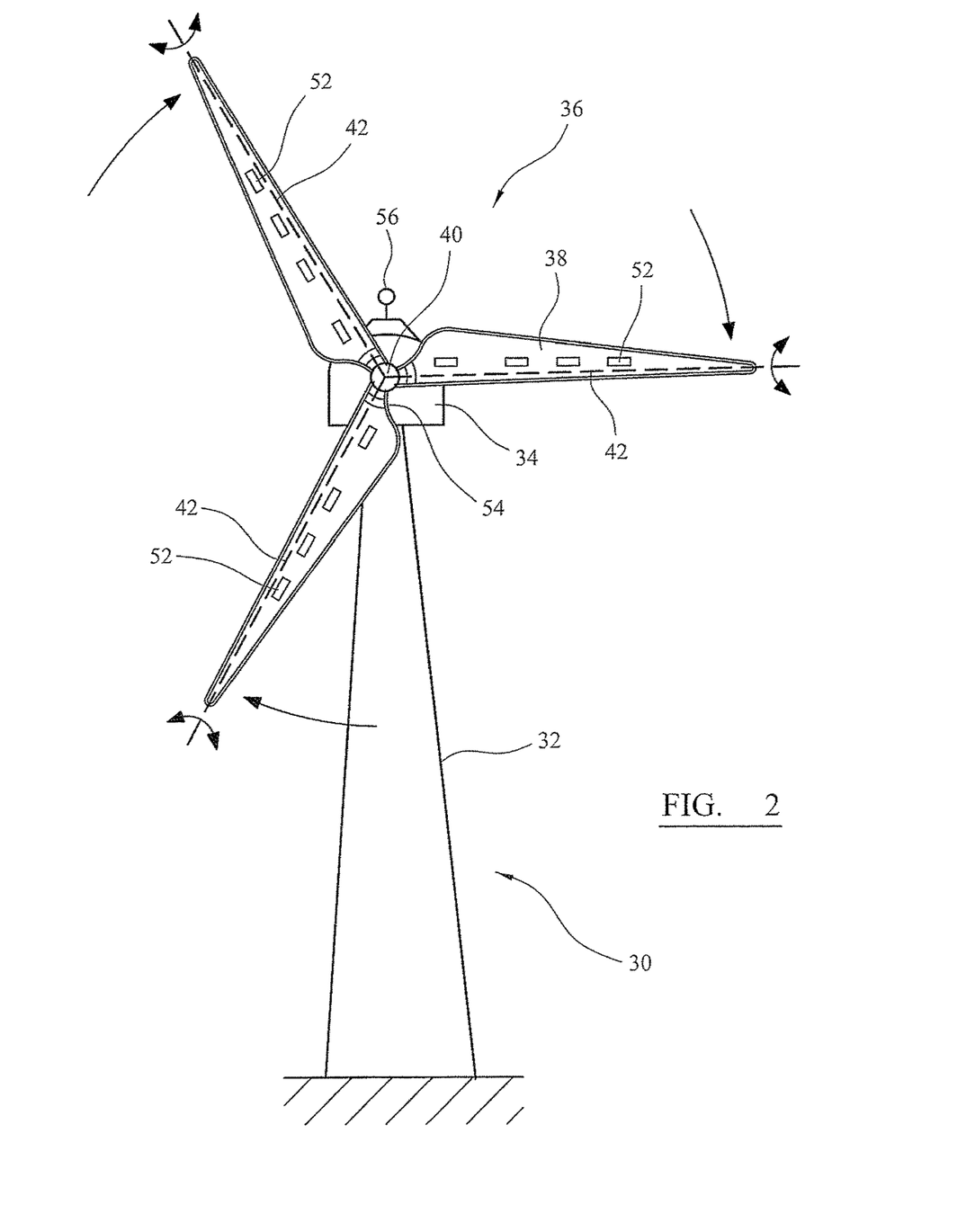
FIG. 2 is a front view of a known wind turbine.

FIG. 2 illustrates a wind turbine 30 embodying the present invention. The wind turbine 30 comprises a wind turbine tower 32 on which a wind turbine nacelle 34 is mounted. A wind turbine rotor 36 comprising a plurality of blades 38 is mounted on a hub 40. The hub 40 is connected to the nacelle 34 through a low speed shaft (not shown) extending from the nacelle front. The wind turbine illustrated in FIG. 2 may be a small model intended for domestic or light utility usage, or it may be a large model, such as those that are suitable for use in large scale electricity generation on a wind farm for example. In the latter case, the diameter of the rotor could be as large as 100 meters or more.

In the wind turbine of FIG. 2, the lift provided by each of the blades 38 is varied by varying the effective shape of the blade facing the wind acting on the blade. For example, the blades can each be pitched, that is to say, rotated about its longitudinal axis 42. The blades may be pitched by an actuator, such as an electric motor or hydraulic device (not shown). The effective shape of each of the blades facing the wind acting on the blade may additionally or alternatively be varied by flaps, such as flaps on the trailing edges of the blades and/or tabs, such as microtabs, located on the blades or forming part of the blades. A flap arrangement is described below.

Figures 3, 3A:
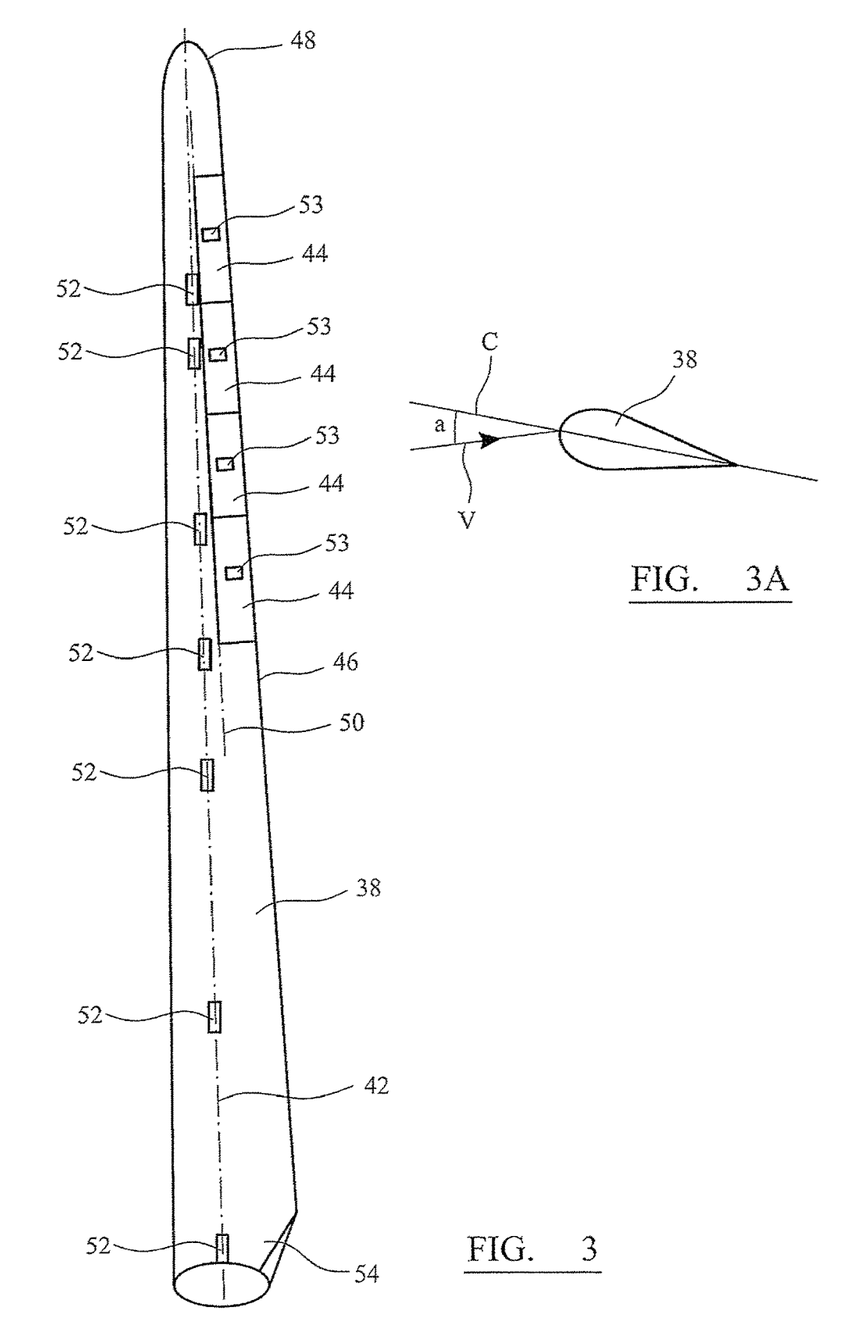
FIG. 3 is a front view of a wind turbine blade for use with embodiments of the present invention.
FIG. 3A is a side view of a cross-section of the wind turbine blade of FIG. 3.

FIG. 3 illustrates a wind turbine blade 38 having one or more components in the form of a plurality of moveable aerodynamic devices in the form of flaps 44 located along a trailing edge 46 of the blade. In this example, the flaps are located towards the free end 48 of the blade, and, in particular, approximately in the half of the blade towards the free end. The flaps are spaced along the trailing edge of the blade. They are each pivotally connected to the blade along a pivot axis (shown by dashed line 50) at an edge spaced from the trailing edge. The flaps change the effective shape of the blade by being pivoted or moved about the pivot axis. The flaps are pivoted about the pivot axis by an actuator such as an electric motor, pneumatic, or hydraulic device (not shown). The change in effective shape of the blade changes the lift provided by the blade. The angle of attack (the acute angle a between the chord c of the blade and the line of relative air flow v illustrated in FIG. 3A) of the blade changes along the blade as different parts of the blade are exposed to different wind conditions though different wind shear and different turbulence at different locations. Each different flap across the blades has a different effect on the lift it provides. In a similar way, if moveable aerodynamic devices in the form of micro tabs are provided on the blade, they each have a different effect on the lift provided. The moveable aerodynamic device (whether it be, for example, flaps or microtabs) can be moved individually so that the coefficient of power of each element (flap or microtab) is optimised. The flaps each include a strain gauge 53 mounted to each flap (flapwise) and/or wind speed and angle of attack detection sensing device (not shown).

Turning back to FIG. 2, the wind turbine 30 of FIG. 2 has an anemometer 56 located on its nacelle 34 for measuring wind speed incident on the wind turbine 30. The wind acting on the anemometer is disturbed by the rotor 36. So, to provide a measure of free stream (undisturbed) flow, a function is applied to the wind speed measured by the anemometer to provide an estimation of the free stream wind speed. Alternatively, a LIDAR device can be used to measure the free stream wind conditions far (e.g. 100 m to 200 m) in front of the wind turbine. The blades 38 of the wind turbine also have strain gauges 52 on them to measure the load acting on the blades. The strain gauges are located along the edgewise or longitudinal direction of the blade. As illustrated in FIG. 3, the strain gauges are typically positioned at the blade root 54 and at 20%, 40%, 50%, 60%, 75% and 80% of the blade radius.

Figure 4:
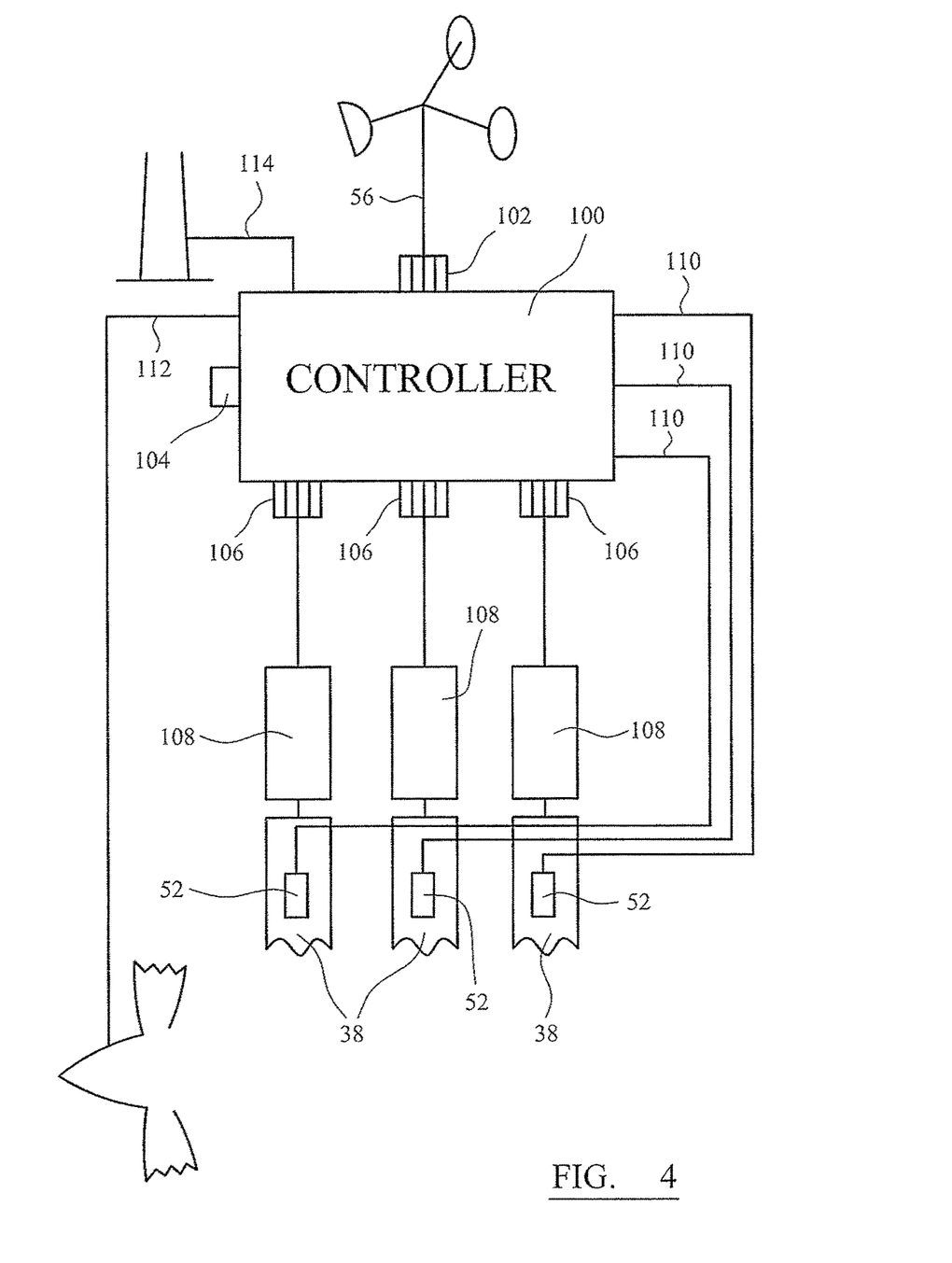
FIG. 4 is a schematic diagram illustrating an embodiment of an aspect of the invention.

FIG. 4 shows an example of the invention in the form of a controller 100 for a wind turbine 30. The controller is located in the nacelle 34 of the wind turbine. The controller individually and independently controls the lift provided by each of the plurality of blades 38 of a wind turbine, such as that of FIG. 2, in order to increase a driving moment of each of the blades of the wind turbine individually and independently of all of the other blades (fully independently). The fully independent control of the wind turbine blades maximises the rotor power below rated wind speed and it is performed under two conditions:

(i) when the wind force or speed acting on the blades is below a lower cut-in wind speed Vmin (and as a result Vmin is reduced);

(ii) and/or the wind force or speed acting on the blades is between the rated wind speed and the lower cut-in wind speed (part load operation).

In other words, the angle-of-attack of the blades and/or blade elements (such as flaps and tabs) of blades of a wind turbine are controlled to more closely match the angles-of-attack that deliver greater or maximum driving moment from the blade concerned. In this way, greater power is generated at wind speeds below the rated wind speed. In particular, individual blade pitching and/or on-blade control devices (moveable aerodynamic devices) are used to maximise or improve the rotor power in wind speeds just below those at which the turbine would normally start to generate (the lower cut-in wind speed Vmin), for example, around 3 to 4 m/s. This results in the wind turbine getting out of idling mode (below lower cut-in wind speed for a DFIG wind turbine, for example) and to getting power onto the electricity grid quicker than it otherwise would in light winds, thereby improving the energy capture in the lowest wind speed regions (part load) of the power curve of FIG. 1.

Additionally, in this example, the controller 100 also individually and independently controls lift provided by each of the plurality of blades 38 of the wind turbine 30 when the wind speed is above the upper cut-out wind speed Vmax and the wind turbine 30 is not producing power (it is disconnected from the electricity distribution system or grid). This is achieved by individually and independently (fully independently) controlling the lift of each blade (such as by pitching the blades or by moving moveable aerodynamic devices, such as flaps 44 or tabs of the blades) so that mechanical loads are reduced and extreme loads or extreme mechanical loads experienced by at least a part of the wind turbine, such as the blades, tower and the foundations of the wind turbine are lowered.

In more detail, the controller 100 of FIG. 4 has an input 102 for inputting a representation or indication of wind force acting on the wind turbine 30. For example, an electrical signal representing a measure of wind speed measured by an anemometer 56, for example a cup anemometer (as illustrated in FIG. 4) or a light detection and ranging (LIDAR) anemometer. The wind force may be measured at the wind turbine. The wind force acting on the wind turbine may additionally or alternatively include measurements of the wind-field upstream of the rotor 36 of the wind turbine. Alternatively or additionally, the electrical signal may represent or indicate load acting on the blades as measured from strain gauges (shown as reference numeral 52 in FIG. 4) located on the blades of the wind turbine. Strain gauges may not be used when LIDAR is used to measure wind speed.

The controller 100 has at least one output, in this case a plurality of outputs 106, for outputting control signals, each output for outputting control signals to an actuator or actuators 108 of each of the blades 38 of the wind turbine 30 for controlling lift provided by each of the plurality of blades of the wind turbine, by including individual blade pitching and/or on board control devices (such as flaps, tabs or microtabs).

The controller 100 also has at least one input, in this case a plurality of inputs 110. Some inputs are for electrical signals from a strain gauge 52,53 or strain gauges of each blade 38 of the wind turbine 30. The strain gauges 52,53 may be strain gauges already located on the wind turbine blades 38 or additional strain gauges. They include edgewise strain gauges 52 spaced along the longitudinal axis 42 of the wind turbine blades (which give an indication of driving moment) and flapwise strain gauges 53 (which give an indication of design-driving loads) located on the flaps of the wind turbine (if the wind turbine blades include flaps).

"Flapwise" is typically used in the art to refer to the direction substantially normal to the chord of the blade, where the "chord" is the distance between the leading edge and the trailing edge, i.e. the flapwise direction is the direction in which the aerodynamic lift acts. "Edgewise" is typically used in the art to refer to the direction substantially parallel to the chord of the blade. The flapwise and edgewise directions are not necessarily in the plane of the rotor as the blades may be pitched.

When on-blade control devices or devices for varying the effective shape of the blade include flaps or microtabs, the inputs 110 may be from measurements of the blade loads from the control devices themselves. An input 112 is also provided for electrical signals indicating the power being generated by the wind turbine and/or an indication of the speed of rotation of the wind turbine rotor. An input or inputs 114 may also be provided to receive electrical signals giving an indication of loads from mechanical components of the wind turbine other than the blades, such as the foundations of the wind turbine.

Electrical power is provided to the controller 100 and to the gauges or other sensors at power input port 104.

The method carried out by the controller 100 may be implemented as a computer program in software on a computer or as dedicated hardware. The computer program may be stored on a computer-readable medium, such as a CD-ROM or DVD-ROM.

The wind speed is measured or sampled by the controller 100 or the time between control time steps of the controller is relatively high bandwidth control; this is not a slow operating supervisory control action. That is to say, the sample rate is typically less than 100 ms, preferably less than 50 ms, and preferably a few 10 s of ms.

Figure 5:
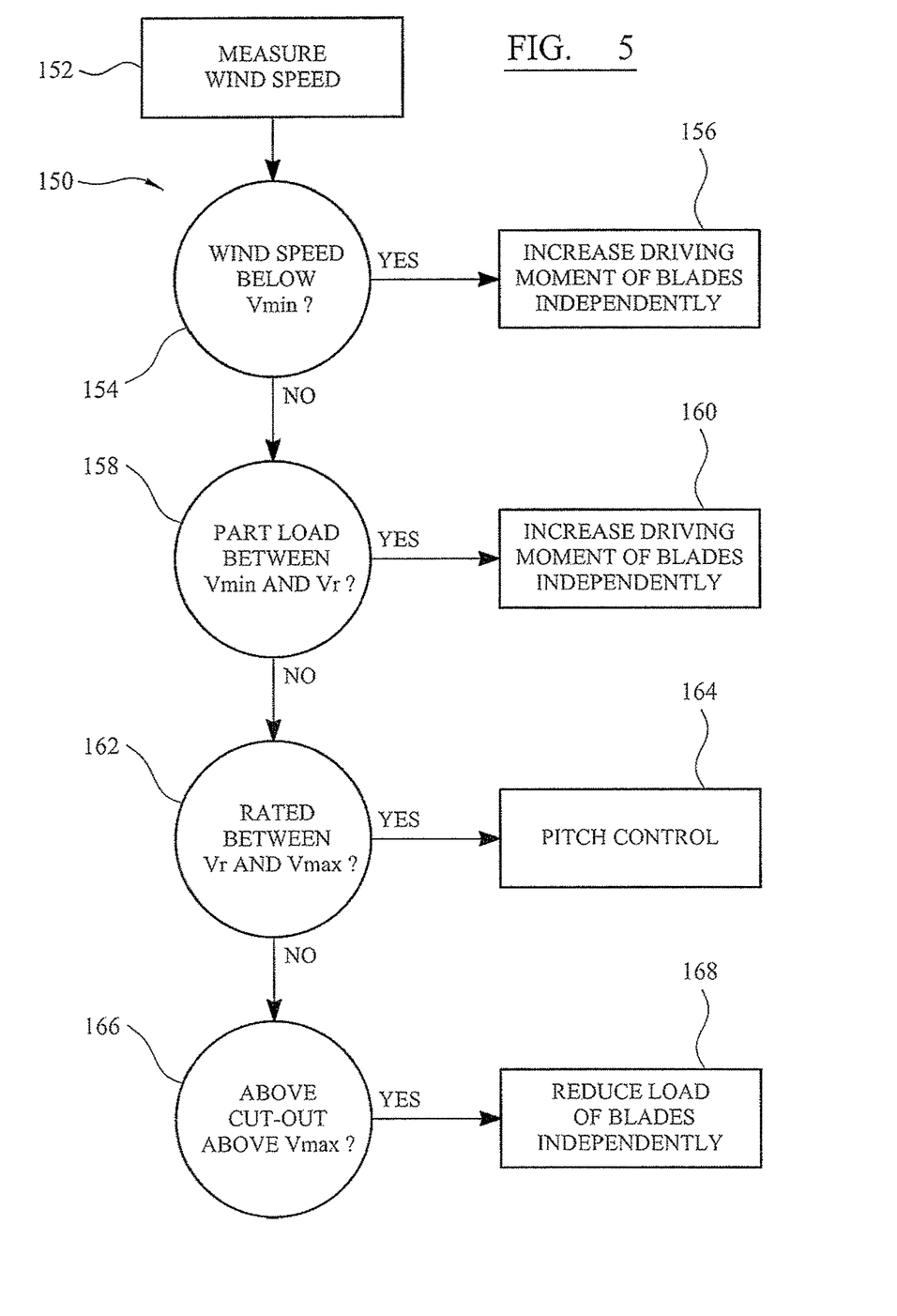
FIG. 5 is a flow diagram illustrating an embodiment of an aspect of the invention.

The operation of the controller 100 is illustrated in the flow diagram FIG. 5. The controller receives electrical signals at the input 102 from the anemometer 56 to produce an indication or representation of the wind speed (step 152) (this indication may additionally or alternatively be provided by strain gauges 52,53). The controller assesses whether the wind speed is below Vmin (step 154). For a DFIG turbine, the wind turbine may be low speed idling, whereas for a full converter turbine, the rotor will not be rotating. If the wind speed is below Vmin, then the controller produces an electrical signal from the outputs 106 to indicate to each of the actuators 108 of the blades 38 to independently increase a driving moment of each blade (step 156). If the driving moment is increased by a blade, then this is reflected in electrical signals indicating that the rotating speed of the rotor has increased. This would also mean that there is an increase in the power generated by the wind turbine and this would also be reflected in appropriate electrical signals. An increase in driving moment is also reflected by electrical signals from edgewise strain gauges 52 (if fitted) of the particular blade at the input 110 of the controller for that blade. This is because if there is an increase in driving moment of the blade, there will be an increase in the stress and corresponding strain across the blade, which will be indicated by the strain gauge. The driving moment from each blade is increased or maximised by (i) individually pitching the blade so that the angle of attack of the blade better matches or matches the angle of attack that will deliver the increased or maximum driving moment from the blade; and/or (ii) using flaps or tabs on the blade to better match or match the aerodynamic performance of the individual blade element to the wind conditions prevailing at that given element.

Figure 6:
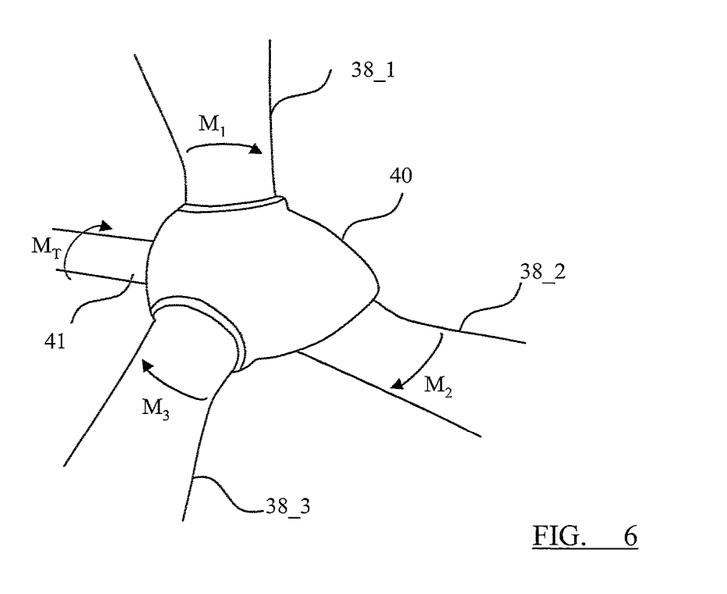
FIG. 6 is a view of a wind turbine rotor.
Figure 7:
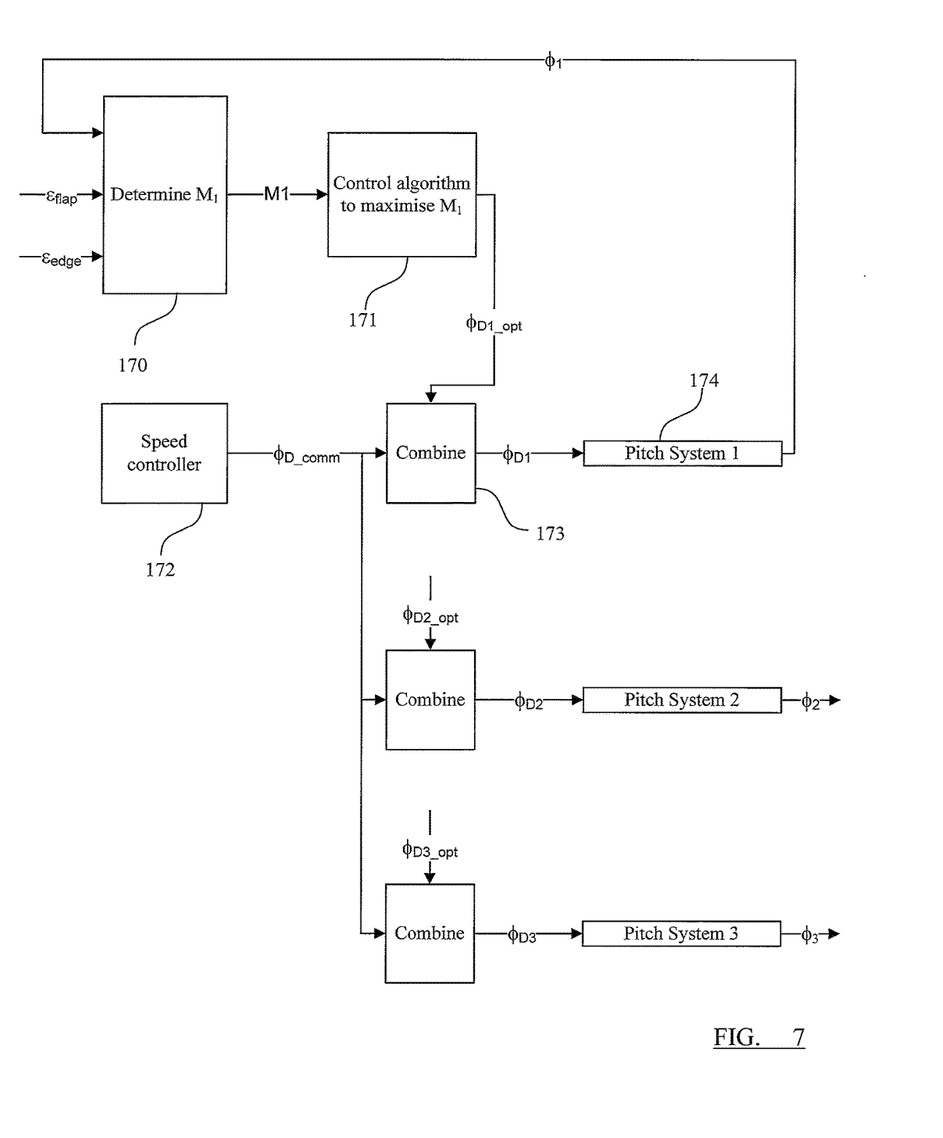
FIG. 7 is a schematic diagram illustrating an embodiment of an aspect of the invention.

FIGS. 6 and 7 described below explain how the driving moment is increased or maximised.

If the wind speed indicates that the wind turbine is not low wind speed idling (below Vmin), the controller then assesses whether the wind turbine is running at part load (step 158) between Vmin (lower cut-in wind speed) and Vr (rated wind speed). If the wind speed indicates that the wind turbine is running at part load (the wind speed is between about 3 to 4 m/s and 13 m/s), then the controller produces an electrical signal from the outputs to indicate to each of the actuators of the blades 38 to increase independently a driving moment of each blade (step 160). If the driving moment is increased by a blade, then this is, again, reflected in electrical signals indicating that the rotating speed of the rotor has increased and also that there is an increase in the power generated by the wind turbine. This is additionally reflected in the electrical signal from the edgewise strain gauges 52 (if fitted) of the particular blade at the input 110 of the controller for that blade. The driving moment from each blade is increased or maximised by (i) individually pitching the blade so that the angle of attack of the blade better matches or matches the angle of attack that will deliver the increased or maximum driving moment from the blade; and/or (ii) using flaps or tabs on the blade to better match or match the aerodynamic performance of the individual blade element to the wind conditions prevailing at that given element.

If the wind speed indicates that the wind turbine is not running at part load (wind speed between Vmin and Vr), the controller then assesses whether the wind turbine is running at full load (wind speed between rated wind speed, Vr and upper cut-out wind speed, Vmax) and therefore delivering the maximum permissible power (step 162). If the wind speed indicates that the wind turbine is running at full load (the wind speed is between about 13 and 25 m/s), then the wind turbine is controlled in the manner well known in the art by pitching the blades in a collective and cyclic manner to regulate the power production (step 164).

If the wind speed indicates that the wind turbine is not operating at full load, the controller then assesses whether the wind speed is above upper cut-out wind speed Vmax and therefore the wind turbine is shut down and no power is being produced (step 166). At shut down, typically, the wind turbine is idling and rotating at about 1 rpm, the blades are pitched at 90° to the direction of rotation and the shaft brake is off. If the wind speed indicates that the wind turbine is shut down and the wind speed is above Vmax (the wind speed is above about 25 m/s), then the controller produces an electrical signal from the outputs to indicate to each of the actuators of the blades to control independently each of the blades (step 168) to reduce the loads acting on the wind turbine. If the loads are reduced, then this is, again, reflected in the electrical signal from the edgewise strain gauge 52 (if fitted) and, in particular, the flapwise strain gauge 53 (if fitted) of the particular blade at the input 110 of the controller for that blade by a decrease in the stress and corresponding strain across the blade, but also from other gauges indicating stresses in other components of the wind turbine such as the foundations. The loads may be reduced by (i) individually pitching the blade so that the angle of attack of the blade generates reduced lift, or the lowest possible lift; and/or (ii) using flaps or tabs on the blade to reduce or produce the lowest possible lift generated by the blade. While upper cut-out wind speed has been described as about 25 m/s it could be other wind speeds depending on the wind turbine design, such as 18 m/s, 20 m/s, or 30 m/s.

The individual control of the blades is particularly useful for alleviating loads experienced by the wind turbine 36 during the rare "EWM" (Extreme Wind speed Model) conditions as defined by the International Electrotechnical Commission (IEC) in standard 61400-1. During such an extreme load, the yaw mechanism may not be available due to loss of electrical grid connection and so the turbine cannot align itself into the wind to reduce the loads it experiences. The controller 100 may determine the yaw error of the 34 (that is the difference between the current wind direction and the direction of the nacelle), and the azimuth angle (that is the angular position of a blade) of the given blade, and then a lookup table provides a pitch angle for each blade as a function of a the yaw error, the azimuth angle, and a 10 minute mean wind speed. The pitch angles will have been chosen offline so that the lift and drag generated by each blade is below a certain limit for the given wind speed and yaw error. These pitch angles will have been selected independently for each blade in order to reduce the mechanical loads experienced by the wind turbine as much as possible. Alternatively, the local wind speed at each blade and the angle of attack of each blade can be measured in real time order to maintain the lift and drag generated by each blade below certain limits.

As shown by the dashed line 22 in FIG. 1, this arrangement results in greater power output at wind speeds below rated. This system can also more quickly reduce the loads experienced by the wind turbine 30 in high winds above Vmax in order to prevent damage to the wind turbine. The latter advantage leads to reduction in extreme loads and in some reduction in fatigue loads. Thus, the blades can be built to resist a lower extreme load and the cost to build the wind turbine is reduced.

While the system has been described as controlling each of the blades of the wind turbine individually at low wind speed idle, below rated (part load), and above cut-out, the controller could control the blades in one or some of these regimes.

The controller 100 may also control the wind turbine 36 to yaw the wind turbine, particularly when LIDAR is used to determine wind conditions. Yaw is rotation of the nacelle 34 about the longitudinal axis of the tower 32 of the wind turbine. Below rated, the controller may control the wind turbine to yaw the wind turbine such that prior to the lift provided by each blade 38 being controlled independently of control of other of the blades to increase a driving moment of the blade, the rotor 36 is yawed to face wind acting on the rotor as measured by LIDAR. Above cut-out wind speed, the controller may control the wind turbine to yaw the rotor of the wind turbine into or away from the direction of the wind, as measured by LIDAR, prior to lift provided by each blade being controlled independently of control of other of the blades in order to reduce the mechanical load of each blade independently of other of the blades.

The controller 100 may also control the wind turbine 30 when LIDAR is used to determine wind conditions, by using the information obtained from the LIDAR device. The LIDAR device can measure the wind conditions upstream of the rotor 36, say 100 meters to 200 meters upstream of the rotor. This advance information of the wind conditions (for example a wind gust may be detected) is provided to the controller 100. Above the cut-out wind speed, the controller 100 may control the wind turbine using the advance wind information, as measured by LIDAR, so that each blade 38 is controlled independently of the other blades in order to reduce the mechanical load of each blade independently of other of the blades, before the wind gust hits the wind turbine.

FIG. 6 illustrates an example of how the driving moment of each blade is determined. FIG. 6 shows three blades 38_1, 38_2 and 38_3 connected to a hub 40. The blades rotate the hub 40 and a low speed shaft 41 which is connected to a gearbox (not shown). The driving moment (or torque) of the shaft 41 is the sum of the driving moments of the three blades, i.e.:

$$M_T = M_1 + M_2 + M_3$$

Where $M_1$, $M_2$, $M_3$ are the driving moment in the rotor plane for each of the three blades.

The driving moments can be determined from strain gauges mounted in the blades measuring the blade's flapwise strain and the blade's edgewise strain. Knowing the flapwise and the edgewise strain and the current pitch angle, the driving moment in the rotor plane can be determined.

FIG. 7 shows an example of how the driving moment of each blade is increased or maximised, by pitching the blade. At step 170 the driving moment $M_1$ in the rotor plane of the first blade is determined from the blade's current pitch angle $\varphi_1$, the blade's root flapwise strain $\varepsilon_{flap}$ and the blade's root edgewise strain $\varepsilon_{edge}$.

At step 171*a* control algorithm calculates an optimum pitch angle demand $\varphi_{D1\_opt}$ that maximises the driving moment $M_1$ in the rotor plane. The control algorithm may be a learning algorithm, learning which pitch angle demand results in the maximum driving moment $M_1$ in the rotor plane. Alternatively, 171 may comprise a lookup table plotting the measured wind speeds against the pitch demand angles.

Wind turbine generators typically have a speed controller, indicated as 172 in FIG. 7 which sets a rotational speed of the rotor. The output from the speed controller 172 is a common pitch demand $\varphi_{D\_comm}$ for all three blades of the rotor to keep the rotational speed within a correct operating range.

At 173 the optimum pitch angle demand $\varphi_{D1\_opt}$ and the common pitch demand $\varphi_{D\_comm}$ are combined (i.e. optimum pitch angle demand $\varphi_{D1\_opt}$ is superimposed on the common pitch demand $\varphi_{D\_comm}$) to provide the pitch demand angle $\varphi_{D1}$ that is provided to the pitch actuator 174 (i.e. a hydraulic or electrical pitch drive) which is used to set the pitch angle $\varphi_1$ of the blade.

FIG. 7 is shown in detail with respect to one blade. However, the process is carried out for all three blades. FIG. 7 shows how the optimum pitch angle demand for the second and third blades are also combined with the common pitch demand $\varphi_{D\_comm}$ and sent to a respective pitch actuator. It should be noted that the steps of calculating the optimum pitch angle demand $\varphi_{Di\_opt}$ for each blade are carried out independently; in other words, the steps 170 and 171 are separate for each blade and have no dependence on each other.

FIG. 7 has been described with respect to maximising the driving moment through individual pitching of the blades. However, the driving moment can also be maximised through the use of flaps and therefore, steps 170 and 171 can be adapted to control flap angles on the blades to increase the driving moment for each blade.

The invention has been described with reference to example implementations, purely for the sake of illustration. The invention is not to be limited by these, as many modifications and variations would occur to the skilled person. The invention is to be understood from the claims that follow.

The invention claimed is:

1. A wind turbine comprising:
a rotor having a plurality of blades, each blade including a sensor that measures a mechanical load on the blade; and
a controller arranged to:
determine a driving moment of each blade based on a signal received from the sensor of the respective blade,
when a speed of wind is below a rated wind speed, control each of the plurality of blades and/or one or more components of each blade independently of other of the blades to maximize the driving moment on each blade based on the signal received from the sensor of the respective blade,
when the speed of wind acting on the blades is above the rated wind speed and below a cut-out wind speed, control the plurality of blades and/or the one or more components of the blades in a collective manner, and
when the speed of wind acting on the blades is above the cut-out wind speed, control each of the plurality of blades and/or the one or more components of each blade independently of other of the blades to reduce the mechanical load experienced by at least a part of the wind turbine based on the signal received from the sensor of the respective blade.

2. The wind turbine according to claim 1, wherein the at least a part of the wind turbine comprises each blade of the wind turbine.

3. The wind turbine according to claim 1, wherein the at least a part of the wind turbine comprises at least one of a tower or foundations of the wind turbine.

4. The wind turbine according to claim 1, wherein the cut-out wind speed is substantially 18 m/s, and the controller is adapted to, when the speed of wind acting on the blades is above the cut-out wind speed and the wind turbine is not producing power, control each of the plurality of blades and/or the one or more components of each blade independently of other of the blades by producing an electrical signal.

5. The wind turbine according to claim 1, wherein the cut-out wind speed is substantially 20 m/s, and the controller is adapted to, when the speed of wind acting on the blades is above the cut-out wind speed and the wind turbine is not producing power, control each of the plurality of blades and/or the one or more components of each blade independently of other of the blades by producing an electrical signal.

6. The wind turbine according to claim 1, wherein the cut-out wind speed is substantially 25 m/s, and the controller is adapted to, when the speed of wind acting on the blades is above the cut-out wind speed and the wind turbine is not producing power, control each of the plurality of blades and/or the one or more components of each blade independently of other of the blades by producing an electrical signal.

7. The wind turbine according to claim 1, wherein the cut-out wind speed is substantially 30 m/s, and the controller is adapted to, when the speed of wind acting on the blades is above the cut-out wind speed and the wind turbine is not producing power, control each of the plurality of blades and/or the one or more components of each blade independently of other of the blades by producing an electrical signal.

8. The wind turbine according to claim 1, wherein the mechanical load is varied by varying an effective shape of the blade facing the wind acting on the blade.

9. The wind turbine according to claim 8, wherein the effective shape of each blade is varied by at least one moveable aerodynamic device.

10. The wind turbine according to claim 9, wherein the at least one moveable aerodynamic device comprises at least one flap of the blade.

11. The wind turbine according to claim 9, wherein the at least one moveable aerodynamic device comprises at least one tab of the blade.

12. The wind turbine according to claim 8, wherein the effective shape of each blade is varied by varying a pitch of each blade.

13. The wind turbine according to claim 1, wherein the speed of wind acting on the blades is assessed based on at least one of a measure of the speed of wind, a load acting on the blades, a rotational speed of the rotor, a position of at least one of the one or more components of the blades, and a generator output power.

14. The wind turbine according to claim 13, wherein the speed of wind acting on the blades is measured by an anemometer of the wind turbine.

15. The wind turbine according to claim 14, wherein the anemometer comprises a light detection and ranging (LIDAR) anemometer.

16. The wind turbine according to claim 14, wherein the anemometer measures the speed of wind upstream of the rotor.

17. The wind turbine according to claim 13, wherein the blades comprise strain gauges to measure the load acting on the blades.

18. The wind turbine according to claim 1, wherein the controller is configured to measure the speed of wind acting on the blades at a plurality of control time steps such that a time between the control time steps of the controller is less than 100 ms.

19. The wind turbine according to claim 18, wherein the controller is configured to measure the speed of wind acting on the blades such that the time between the control time steps of the controller is less than 50 ms.

20. The wind turbine according to claim 1, wherein the wind turbine is further arranged such that prior to or at substantially the same time as controlling each of the plurality of blades and/or the one or more components of each blade independently when the speed of wind acting on the blades is above the cut-out wind speed, the rotor is yawed to reduce the mechanical load experienced by at least a part of the wind turbine.

21. The wind turbine according to claim 1, wherein the wind turbine comprises a light detection and ranging (LIDAR) anemometer which is arranged to provide information on wind conditions in a wind direction upstream of the wind turbine; and
the wind turbine is further arranged such that controlling each of the plurality of blades and/or the one or more components of each blade independently is based on the information on the wind conditions in the wind direction upstream of the wind turbine.

22. The wind turbine according to claim 1 further comprising:
a generator coupled to the rotor.

23. The wind turbine according to claim 22, wherein the cut-in wind speed is substantially 4 m/s, and the controller is adapted to, when the speed of wind acting on the blades is above the cut-in wind speed and below the rated wind speed, increase the driving moment of each blade independently of other of the blades by producing an electrical signal.

24. The wind turbine according to claim 22, wherein the cut-in wind speed is substantially 3 m/s, and the controller is adapted to, when the speed of wind acting on the blades is above the cut-in wind speed and below the rated wind speed, increase the driving moment of each blade independently of other of the blades by producing an electrical signal.

25. The wind turbine according to claim 22, wherein the rated wind speed is substantially 13 m/s, and the controller is adapted to, when the speed of wind acting on the blades is above the cut-in wind speed and below the rated wind speed, increase the driving moment of each blade independently of other of the blades by producing an electrical signal.

26. The wind turbine according to claim 22, wherein the rated wind speed is substantially 12 m/s, and the controller is adapted to, when the speed of wind acting on the blades is above the cut-in wind speed and below the rated wind speed, increase the driving moment of each blade independently of other of the blades by producing an electrical signal.

27. The wind turbine according to claim 22, wherein the controller is arranged to control independently each of the blades in order to maximize a lift force produced by the blades when the speed of wind acting on the blades is below the rated wind speed of the wind turbine.

28. The wind turbine according to claim 1, wherein, when the speed of wind acting on the blades is above the cut-out wind speed, a generator of the wind turbine is disconnected from an electricity distribution network.

29. A wind turbine controller for controlling blades of a wind turbine, the controller comprising:
at least one input for inputting a representation of a wind force acting on the wind turbine,
at least one input for inputting a representation of a mechanical load acting on each blade of the wind turbine, the controller determining a driving moment of each blade based on the representation of the mechanical load on the respective blade,
at least one output arranged to output control signals to:
when a speed of wind is below a rated wind speed, control each of the plurality of blades and/or one or more components of each blade independently of other of the blades to maximize the driving moment on each blade based on the representation of the mechanical load of the respective blade,
when the representation of the wind force at the at least one input indicates that the speed of wind acting on the blades is above the rated wind speed and below a cut-out wind speed, control the blades and/or the one or more components of the blades in a collective manner, and
when the representation of the wind force at the at least one input indicates that the speed of wind acting on the blades is above the cut-out wind speed, control each blade independently of other of the blades and/or the one or more components of each blade to reduce the mechanical load experienced by at least a part of the wind turbine based on the signal received from the sensor of the respective blade.

30. A method of controlling a wind turbine including a rotor having a plurality of blades, each blade including a sensor that measures a mechanical load on the blade, the method comprising:
determining a driving moment of each blade based on a signal received from the sensor of the respective blade,
controlling each of the plurality of blades and/or one or more components of each blade independently of other of the blades to maximize the driving moment on each blade based on the signal received from the sensor of the respective blade at a speed of wind below a rated wind speed, controlling the plurality of blades and/or the one or more components of the blades in a collective manner at a speed of wind above the rated wind speed and below a cut-out wind speed, and controlling each of the plurality of blades of the wind turbine and/or the one or more components of each blade independently of other of the blades to reduce the mechanical load experienced by at least a part of the wind turbine based on the signal received from the sensor of the respective blade at a wind speed above the cut-out wind speed.

31. A wind turbine, comprising:

a rotor having a plurality of blades, each blade including a sensor that measures a mechanical load on the blade; and a controller arranged to:

determine a driving moment of each blade based on a signal received from the sensor of the respective blade, when a speed of wind is below a rated wind speed, control each of the plurality of blades and/or one or more components of each blade independently of other of the blades to maximize the driving moment on each blade based on the signal received from the sensor of the respective blade, when the speed of wind acting on the blades is above the rated wind speed and below a cut-out wind speed, control the plurality of blades and/or the one or more components of the blades in a collective manner, and when the speed of wind acting on the blades is above the cut-out wind speed, control each of the plurality of blades and/or the one or more components of each blade independently of other of the blades to reduce the mechanical load experienced by at least a part of the wind turbine based on the signal received from the sensor of the respective blade;

wherein the wind turbine is further arranged such that prior to or at substantially the same time as controlling each of the plurality of blades and/or the one or more components of each blade independently when the speed of wind acting on the blades is above the cut-out wind speed, the rotor is yawed to reduce the mechanical loads experienced by the at least the part of the wind turbine.

32. The wind turbine according to claim 31, wherein the speed of wind is measured upstream of the rotor.

33. The wind turbine according to claim 31, wherein the speed of wind is measured by a light detection and ranging (LIDAR) anemometer.

34. A wind turbine controller for a wind turbine including rotor having a plurality of blades, the wind turbine controller being arranged to:

determine a driving moment of each blade based on a signal received from a sensor of the respective blade, when a speed of wind is below a rated wind speed, control each of the plurality of blades and/or one or more components of each blade independently of other of the blades to maximize the driving moment on each blade based on the signal received from the sensor of the respective blade, when the speed of wind acting on the blades is above the rated wind speed and below a cut-out wind speed, control the plurality of blades and/or the one or more components of the blades in a collective manner, when the speed of wind acting on the blades is above the cut-out wind speed, control each of the plurality of blades and/or the one or more components of each blade independently of other of the blades to reduce the mechanical load experienced by at least a part of the wind turbine based on the signal received from the sensor of the respective blade, and prior to or at substantially the same time as controlling each of the plurality of blades and/or the one or more components of each blade independently when the speed of wind is above the cut-out wind speed, yaw the rotor of the wind turbine to reduce the mechanical loads experienced by the at least the part of the wind turbine.

35. A method of controlling a wind turbine including a rotor having a plurality of blades, each blade including a sensor that measures a mechanical load on the blade, the method comprising:

determining a driving moment of each blade based on a signal received from the sensor of the respective blade, controlling each of the plurality of blades and/or one or more components of each blade independently of other of the blades to maximize the driving moment on each blade based on the signal received from the sensor of the respective blade at a speed of wind below a rated wind speed, controlling the plurality of blades of the wind turbine and/or the one or more components of the blades in a collective manner at a speed of wind above the rated wind speed and below a cut-out wind speed, controlling each of the plurality of blades and/or the one or more components of each blade independently of other of the blades to reduce the mechanical load experienced by at least a part of the wind turbine based on the signal received from the sensor of the respective blade at a wind speed above the cut-out wind speed; and prior to or at substantially the same time as controlling each of the plurality of blades and/or the one or more components of each blade independently of other of the blades above the cut-out wind speed, yawing a rotor of the wind turbine to reduce the mechanical loads experienced by the at least the part of the wind turbine.

36. The wind turbine of claim 1 further comprising:

a nacelle, wherein the controller is further adapted to:

determine a yaw error based on a direction of the wind and a direction of the nacelle, and determine an azimuth angle for each blade of the plurality of blades, independently adjust a pitch angle of each blade of the plurality of blades based on the yaw error and the azimuth angle for the respective blade.

* * * * *